(12) United States Patent
Matsumoto et al.

(10) Patent No.: US 11,066,515 B2
(45) Date of Patent: Jul. 20, 2021

(54) POLYESTER RESIN COMPOSITION AND METHOD OF PRODUCING SAME

(71) Applicant: Toray Industries, Inc., Tokyo (JP)

(72) Inventors: Mayumi Matsumoto, Mishima (JP); Zemeng Sun, Mishima (JP); Jun Sakamoto, Mishima (JP)

(73) Assignee: Toray Industries, Inc., Tokyo (JP)

( * ) Notice: Subject to any disclaimer, the term of this patent is extended or adjusted under 35 U.S.C. 154(b) by 31 days.

(21) Appl. No.: 16/621,430

(22) PCT Filed: Jul. 6, 2018

(86) PCT No.: PCT/JP2018/025711
§ 371 (c)(1),
(2) Date: Dec. 11, 2019

(87) PCT Pub. No.: WO2019/021787
PCT Pub. Date: Jan. 31, 2019

(65) Prior Publication Data
US 2021/0087331 A1 Mar. 25, 2021

(30) Foreign Application Priority Data

Jul. 27, 2017 (JP) .............................. JP2017-145436

(51) Int. Cl.
*C08G 63/83* (2006.01)
*C08G 63/183* (2006.01)
(52) U.S. Cl.
CPC ........... *C08G 63/183* (2013.01); *C08G 63/83* (2013.01)

(58) Field of Classification Search
USPC ......................... 528/271, 272, 273, 274, 275
See application file for complete search history.

(56) References Cited

U.S. PATENT DOCUMENTS

| 2013/0253165 A1 | 9/2013 | Matsumoto et al. |
| 2014/0023841 A1 | 1/2014 | Suzuki et al. |
| 2018/0126714 A1* | 5/2018 | Motoshiromizu ....... C08K 3/32 |

FOREIGN PATENT DOCUMENTS

| JP | 2003-96280 A | 4/2003 |
| JP | 2003-176347 A | 6/2003 |
| JP | 2014-65882 A | 4/2014 |
| WO | 2012/032876 A1 | 3/2012 |
| WO | 2012/121076 A1 | 9/2012 |
| WO | 2016/167084 A1 | 10/2016 |

* cited by examiner

*Primary Examiner* — Terressa Boykin
(74) *Attorney, Agent, or Firm* — DLA Piper LLP (US)

(57) ABSTRACT

A polyester resin composition is excellent in heat resistance and hydrolysis resistance and results in a small amount of a gel composition and linear oligomers generated during a melt-molding step and a processing step. The polyester resin composition satisfies formulas (I) to (IV):

| the amount of generated linear oligomers<900 ppm | (I) |
| $\Delta$COOH/COOH$\leq$2.0 | (II) |
| 5 ppm$\leq$Mn content$\leq$40 ppm | (III) |
| 4 ppm$\leq$Na content$\leq$40 ppm | (IV). |

14 Claims, No Drawings

POLYESTER RESIN COMPOSITION AND METHOD OF PRODUCING SAME

TECHNICAL FIELD

This disclosure relates to a polyester resin composition that is excellent in heat resistance and hydrolysis resistance and results in a small amount of a gel composition and linear oligomers generated during a melt-molding step and a processing step, and a method of producing the polyester resin composition.

BACKGROUND

Polyester resins are excellent in mechanical properties, thermal properties, chemical resistance, electrical properties and molding properties, and used in various applications. In particular, among polyester resins, polyethylene terephthalate (hereinafter PET) has excellent transparency and processability, and therefore is used widely in the application that requires high quality such as an optical film and a releasable film. However, linear oligomers such as PET monomer components and low molecular weight oligomers (oligomer components) are generated and increased due to the degradation reaction of the polyester resin. Such linear oligomers volatilize and scatter during molding and processing, which may result in surface contamination of the molded product. In addition, scattering of such linear oligomers may also result in process contamination, which causes a problem of deterioration of the quality of a molded product due to surface contamination or process contamination. Furthermore, thermal degradation and/or oxidative degradation of the polyester resin during melt-molding results in generation of a gel composition, which causes a problem of process contamination such as die contamination. Furthermore, in a film application and the like, this gel composition becomes a bright spot defect in a film, thereby reducing the quality. In recent years, the demand for the quality of optical films, releasable films and the like have been increasing, and polyester resins that suppress generation of linear oligomers and gel compositions that cause surface contamination, process contamination, and defects as described above have been desired. Various studies have been made on such issues.

For example, JP 2003-176347 A discloses a technique to decrease the oligomer content in a polyester resin and the amount of oligomer regeneration upon melting by performing solid phase polymerization and deactivation treatment.

WO 2016/167084 discloses a technique to suppress the scattering of linear oligomers by containing an ionic liquid in the polyester.

Furthermore, J P 2003-96280 A discloses a technique to suppress a gel composition by controlling the molar ratio of the metal amount and the phosphorus amount to a high range.

Solid phase polymerization and deactivation treatment, as described above as the conventional technology, only reduce cyclic oligomers contained in the polyester resin or generated during molding processing and have no effect on linear oligomers generated and increased due to different mechanisms such as thermal decomposition and hydrolysis during melting. Therefore, the surface contamination of products or process contamination could not be prevented. Furthermore, addition of an ionic liquid to suppress the scattering of the linear oligomers and a high range of the molar ratio of metal and phosphorus for gel suppression resulted in a problem of decreased heat resistance and hydrolysis resistance.

It could therefore be helpful to provide a polyester resin composition that is excellent in heat resistance and hydrolysis resistance and results in a small amount of a gel composition and linear oligomers generated during a melt-molding step and a processing step, and a method of producing the polyester resin composition.

SUMMARY

We thus provide:
(1) A polyester resin composition, wherein formulas (I) to (IV) are satisfied.

$$\text{The amount of generated linear oligomers (weight ratio with respect to the polyester resin composition)} < 900 \text{ ppm} \quad \text{(I)}$$

$$\Delta\text{COOH/COOH} \leq 2.0 \quad \text{(II)}$$

$$5 \text{ ppm} \leq \text{Mn content (weight ratio with respect to the polyester resin composition)} \leq 40 \text{ ppm} \quad \text{(III)}$$

$$4 \text{ ppm} \leq \text{Na content (weight ratio with respect to the polyester resin composition)} \leq 40 \text{ ppm} \quad \text{(IV)}$$

ΔCOOH herein is an increased amount of COOH end groups (equivalent/ton) after a moist-heat treatment under saturated steam at 155° C. for 4 hours, and COOH is an amount of carboxyl end groups (equivalent/ton) in the polyester resin composition before the moist-heat treatment.

(2) The polyester resin composition according to (1), wherein the total content of elements selected from nitrogen, sulfur and a halogen (weight ratio with respect to the polyester resin composition) is less than 10 ppm.
(3) The polyester resin composition according to (1) or (2), wherein the content of phosphorus element (weight ratio with respect to the polyester resin composition) is 17 ppm or more and 70 ppm or less.
(4) The polyester resin composition according to any one of (1) to (3), wherein Na/P, which is a molar ratio of the content of sodium element to the content of phosphorus element, is 0.3 or more and 1.2 or less.
(5) The polyester resin composition according to any one of (1) to (4), wherein the gelation ratio is 7 wt % or less.
(6) The polyester resin composition according to any one of (1) to (5), wherein the polyester is polyethylene terephthalate.
(7) A polyester film composed of the polyester resin composition according to (1).
(8) A laminated polyester film having at least one layer composed of the polyester resin composition according to (1).
(9) A laminated polyester film having a layer composed of the polyester resin composition according to (1) on at least one surface.
(10) A releasable polyester film composed of the polyester resin composition according to (1).
(11) A method of producing a polyester resin composition, comprising subjecting a dicarboxylic acid component or an ester-forming derivative component thereof and a diol component to an esterification reaction or a transesterification reaction followed by a polycondensation reaction to produce a polyester, wherein a manganese compound is added while the IV (intrinsic viscosity) of the polyester is 0.4 or less, a phosphorus compound and alkali metal phosphate are added before the end of the polycondensation reaction, and the contents thereof satisfy formulas (V) and (VI).

$$5 \text{ ppm} \leq \text{Mn content (weight ratio with respect to the polyester resin composition)} \leq 40 \text{ ppm} \quad \text{(V)}$$

4 ppm≤alkali metal element content (weight ratio
with respect to the polyester resin composition)
≤40 ppm     (VI)

(12) The method of producing a polyester resin composition according to (11), wherein the alkali metal phosphate is sodium phosphate.
(13) The method of producing a polyester resin composition according to (11) or (12), wherein the phosphorus compound is phosphoric acid.
(14) The method of producing a polyester resin composition according to any one of (11) to (13), wherein the polyester is polyethylene terephthalate.

A polyester resin composition that is excellent in heat resistance and hydrolysis resistance and results in a small amount of a gel composition and linear oligomers that are generated during a melt-molding step and a processing step can be provided.

DETAILED DESCRIPTION

Our compositions and methods will be described below in detail.

The polyester resin refers to a polyester resin obtained by polycondensation of a dicarboxylic acid component and a diol component.

Examples of the dicarboxylic acid component include various dicarboxylic acid components such as aromatic dicarboxylic acids, chain aliphatic dicarboxylic acids, and alicyclic dicarboxylic acids. Among these, from the viewpoint of mechanical properties, heat resistance, and hydrolysis resistance of the polyester resin composition, aromatic dicarboxylic acids and ester-forming derivative components thereof are preferred. In particular, terephthalic acid, isophthalic acid, naphthalenedicarboxylic acid and ester-forming derivative components thereof are preferred from the viewpoint of polymerizability and mechanical properties.

Various diols can be used as the diol component. Examples thereof include aliphatic diols such as ethylene glycol, 1,2-propanediol, 1,3-propanediol, butanediol, 2-methyl-1,3-propanediol, hexanediol, and neopentyl glycol, alicyclic diols including saturated alicyclic primary diols such as cyclohexane dimethanol, cyclohexane diethanol, decahydronaphthalene dimethanol, decahydronaphthalene diethanol, norbornane dimethanol, norbornane diethanol, tricyclodecane dimethanol, tricyclodecane diethanol, tetracyclododecane dimethanol, tetracyclododecane diethanol, decalin dimethanol, and decalin diethanol, cyclic ether-containing saturated heterocyclic primary diols such as 2,6-dihydroxy-9-oxabicyclo[3,3,1]nonane, 3,9-bis(2-hydroxy-1,1-dimethylethyl)-2,4,8,10-tetraoxaspiro[5,5]undecane (spiroglycol), 5-methylol-5-ethyl-2-(1,1-dimethyl-2-hydroxyethyl)-1,3-dioxane, and isosorbide, and other various alicyclic diols such as cyclohexanediol, bicyclohexyl-4,4'-diol, 2,2-bis(4-hydroxycyclohexylpropane), 2,2-bis(4-(2-hydroxyethoxy)cyclohexyl)propane, cyclopentanediol, 3-methyl-1,2-cyclopentadiol, 4-cyclopentene-1,3-diol, and adamandiol, and aromatic cyclic diols such as bisphenol A, bisphenol S, styrene glycol, 9,9-bis(4-(2-hydroxyethoxy)phenyl)fluorene, and 9,9'-bis(4-hydroxyphenyl)fluorene. In addition to diols, polyfunctional alcohols such as trimethylolpropane and pentaerythritol can also be used.

Among these, a diol having a boiling point of 230° C. or less is preferred because distillation out of the reaction system is easy, and an aliphatic diol is more preferred from the viewpoint of the low cost and high reactivity. Furthermore, ethylene glycol is particularly preferred from the viewpoint of the mechanical properties of the resulting polyester resin composition and molded product thereof. Other dicarboxylic acid components, hydroxycarboxylic acid derivatives, and diol components may be copolymerized to such an extent that the scope of the desired effect is not impaired.

The amount of generated linear oligomers needs to be less than 900 ppm (weight ratio with respect to the polyester resin composition). The amount of generated linear oligomer herein is the increased amount of linear oligomers after a polyester resin composition that has been left in an environment at a temperature of 23° C. and with a humidity of 50% for 24 hours or more is heated at 290° C. for 20 minutes in a nitrogen atmosphere. Usually, the polyester resin is dried before melt processing to suppress hydrolysis. Since the linear oligomers are also generated by hydrolysis of the polyester resin, the polyester resin is preferably dried before the melt processing. However, if generation of the linear oligomers can be suppressed even in an undried polyester resin, the drying step can be omitted, resulting in a significant cost reduction. By improving the heat resistance and hydrolysis resistance of the polyester resin, even with a high moisture content, the amount of generated linear oligomers can be drastically reduced.

The linear oligomer is a monomer component or an oligomer component produced due to a decomposition reaction such as thermal decomposition, hydrolysis, oxidative decomposition or the like of the polyester resin. Specifically, the linear oligomer refers to a dicarboxylic acid component constituting the polyester resin or a chain reaction product formed by the reaction of a carboxyl group of a dicarboxylic acid and a hydroxyl group of a diol, and does not include cyclic oligomers such as cyclic trimers. Specific examples thereof include dicarboxylic acid monomers and monoesters or diesters with a glycol component. This linear oligomer is easily sublimated and precipitated and, thus, causes process contamination and surface contamination of the molded article in processing steps such as melt-molding.

In PET which is a typical polyester resin, examples of the linear oligomers include TPA (terephthalic acid), and MHET (monohydroxyethyl terephthalate) and BHET (bishydroxyethyl terephthalate), which are reaction products of terephthalic acid and ethylene glycol. For the total amount of these linear oligomers, the generated amount needs to be less than 900 ppm, preferably less than 800 ppm, and more preferably less than 700 ppm. When the amount of generated linear oligomers is in the above-mentioned range, the process contamination and the surface contamination, which result from linear oligomers and become problematic during the molding process, can be decreased.

The polyester resin composition needs to have a value of ΔCOOH/COOH, which is an indicator of hydrolysis resistance, of 2.0 or less. ΔCOOH herein is an increased amount of COOH end groups after a moist-heat treatment under saturated steam at 155° C. for 4 hours, and when divided by the amount of COOH end groups before the treatment, a smaller value of ΔCOOH/COOH means better hydrolysis resistance. The value of ΔCOOH/COOH needs to be 2.0 or less, and more preferably 1.9 or less. In the above-mentioned range, good hydrolysis resistance is obtained and, thus, generation of linear oligomers resulting from hydrolysis can be suppressed.

The polyester resin composition needs to contain a manganese element with a content of 5 ppm or more and 40 ppm or less (weight ratio with respect to the polyester resin composition) as described by formula (III).

5 ppm≤Mn content≤40 ppm     (III)

The lower limit is preferably 10 ppm or more. The upper limit is preferably 30 ppm or less. When the manganese content is the above-mentioned lower limit or more, the gel composition generated during the melt-molding can be suppressed and, thus, defects of a molded article can be suppressed. In addition, manganese element also contributes to thermal decomposition, oxidative decomposition, and hydrolysis of the polyester because of its high catalytic activity even in a heat treatment at a relatively low temperature below the melting point of the polyester such as in a film stretching step. Therefore, when the manganese element amount is the above-mentioned upper limit or less, the amount of linear oligomers generated in the processing step can be reduced.

The polyester resin composition also needs to contain a sodium element with a content of 4 ppm or more and 40 ppm or less (weight ratio with respect to the polyester resin composition) as described by formula (IV).

$$4 \text{ ppm} \leq \text{Na content} \leq 40 \text{ ppm} \quad (IV)$$

The lower limit is preferably 10 ppm or more. The upper limit is preferably 30 ppm or less. In the above-mentioned range, good hydrolysis resistance is obtained and, thus, generation of linear oligomers resulting from hydrolysis can be suppressed. When the Na content is outside the above-mentioned range, the hydrolysis resistance of the polyester resin composition deteriorates.

Furthermore, the polyester resin composition preferably contains a phosphorus element (P) with a content of 17 ppm or more and 70 ppm or less. The lower limit is preferably 20 ppm or more, and more preferably 25 ppm or more. The upper limit is preferably 60 ppm or less, and more preferably 50 ppm or less. In the above-mentioned range, the amount of linear oligomers generated in the processing step can be reduced.

Furthermore, in the polyester resin composition, Na/P which is a molar ratio of the content of the sodium element to the content of the phosphorus element is preferably 0.3 or more and 1.2 or less. The lower limit is more preferably 0.4 or more, and the upper limit is preferably 1.0 or less, and more preferably 0.9 or less. In the above-mentioned range, hydrolysis resistance can be obtained and, thus, the amount of linear oligomers generated during the processing step can be reduced.

The total content of elements selected from nitrogen, sulfur and a halogen is preferably less than 10 ppm (weight ratio with respect to the polyester resin composition). The total content of the elements is more preferably less than 5 ppm, and further preferably less than 3 ppm. A compound containing an element such as nitrogen, sulfur or a halogen facilitates thermal decomposition or hydrolysis when present in a polyester. Therefore, most preferably, the polyester resin composition does not contain an element such as nitrogen, sulfur or a halogen. In the above-mentioned range, the amount of linear oligomers generated in the processing step can be reduced.

The gelation ratio after a 6-hour heat treatment at 300° C. under a nitrogen atmosphere with an oxygen concentration of 1% is preferably 7 wt % or less. The gelation ratio is more preferably 5 wt % or less. In the above-mentioned range, generation of a gel composition during the melt-molding can be suppressed and, thus, defects of a molded article can be suppressed.

The method of producing a polyester resin composition will be explained below.

The polyester resin composition can be obtained by subjecting a dicarboxylic acid component or an ester-forming derivative component thereof and a diol component to an esterification reaction or a transesterification reaction, followed by a polycondensation reaction to produce a polyester, wherein a manganese compound is added while the IV (intrinsic viscosity) of the polyester is 0.4 or less, a phosphorus compound and alkali metal phosphate are added before the end of the polycondensation reaction, and the contents thereof (weight ratio with respect to the polyester resin composition) satisfy formulas (V) and (VI).

$$5 \text{ ppm} \leq \text{Mn content} \leq 40 \text{ ppm} \quad (V)$$

$$4 \text{ ppm} \leq \text{alkali metal element content} \leq 40 \text{ ppm} \quad (VI)$$

In the method of producing a polyester resin composition, it is necessary to add the manganese compound while the IV (intrinsic viscosity) of the polyester resin is 0.4 or less. By adding the manganese compound in the above-mentioned range, the polymerization reactivity and the dispersibility in the polyester resin are improved, resulting in increased transparency. Among these, when a polyester oligomer is obtained by a transesterification reaction, a manganese compound is preferably added at the start of the transesterification reaction to advance the reaction more efficiently. Furthermore, when a polyester oligomer is obtained by an esterification reaction, a manganese compound is preferably added while the IV of the polyester resin is 0.4 or less after the end of the esterification reaction, and more preferably between the end of the esterification reaction and the start of the polycondensation reaction. The esterification reaction proceeds sufficiently even without a catalyst due to a self-catalytic reaction of an acid component such as terephthalic acid. Since by-products such as dimers of a diol component increase when a catalyst is contained, the esterification reaction is carried out without a catalyst, and the manganese compound is added before the viscosity of the polyester increases. Thus, without the deterioration of the heat resistance, the dispersibility of the manganese compound is improved and high transparency can be achieved.

In the method of producing a polyester resin composition, for the amount of the manganese compound to be added, the content of the manganese element in the polyester composition (weight ratio with respect to the polyester resin composition) needs to satisfy formula (V).

$$5 \text{ ppm} \leq \text{Mn content} \leq 40 \text{ ppm} \quad (VII)$$

The lower limit is preferably 10 ppm or more. The upper limit is preferably 30 ppm or less. When the manganese content is the above-mentioned lower limit or more, generation of a gel composition during the melt-molding can be suppressed and, thus, defects of a molded article can be suppressed. On the other hand, the manganese element also contributes to thermal decomposition, oxidative decomposition, and hydrolysis of the polyester resin because of its high catalytic activity even in a heat treatment at a relatively low temperature below the melting point of the polyester such as in a film stretching step. Therefore, when the manganese element amount is the above-mentioned upper limit or less, the amount of linear oligomers generated in the processing step can be reduced.

The manganese compound is not specifically limited. Examples thereof include manganese acetate, manganese nitrate, manganese sulfate, manganese chloride, and the like, and manganese acetate is preferred from the viewpoint of its solubility and catalytic activity.

The form at the time of addition may be any of powder, slurry, and solution. From the viewpoint of dispersibility, the manganese compound is preferably added as a solution. In this example, the solvent is preferably the same as the diol component of the polyester resin composition. In polyethylene terephthalate, ethylene glycol is particularly preferably used.

In the method of producing a polyester resin composition, it is necessary to add a phosphorus compound and alkali metal phosphate before the polycondensation reaction is completed. More preferably, the timing for the addition of the phosphorus compound and the alkali metal phosphate is between the end of the transesterification reaction or the esterification reaction and the start of the polycondensation reaction. By adding the phosphorus compound and the alkali metal phosphate in the above-mentioned range, thermal stability and hydrolysis resistance can be effectively imparted to the polyester resin without any delay of the polycondensation reaction.

Examples of the type of the phosphorus compound to be used include phosphoric acid, phosphorus acid, trimethyl phosphoric acid, ethyl diethylphosphonoacetate and the like. Among these, the use of phosphoric acid is preferred because a good value of ΔCOOH/COOH, which is related to heat and moisture resistance, is obtained. The amount of the phosphorus compound to be added is not particularly limited, but in phosphoric acid, the lower limit of the amount to be added is preferably 25 ppm or more, more preferably 45 ppm or more. The upper limit of the amount to be added is preferably 200 ppm or less, and more preferably 150 ppm or less. The above-mentioned range can result in good thermal stability of the polyester resin composition without a delay of polymerization. Since phosphoric acid is usually available as an aqueous solution, the above-mentioned amount to be added is the net amount of the phosphoric acid component to be added which is converted from the concentration of the aqueous solution.

The amount of the alkali metal phosphate to be added should be such that the content of an alkali metal element in the polyester composition is 4 ppm or more and 40 ppm or less. The lower limit is preferably 10 ppm or more. The upper limit is preferably 30 ppm or less. In the above-mentioned range, good hydrolysis resistance is obtained and, thus, generation of linear oligomers resulting from hydrolysis can be suppressed.

Examples of the alkali metal phosphate include sodium dihydrogen phosphate, disodium hydrogen phosphate, trisodium phosphate, potassium dihydrogen phosphate, dipotassium hydrogen phosphate, tripotassium phosphate, lithium dihydrogen phosphate, dilithium hydrogen phosphate and trilithium hydrogen phosphate. From the viewpoint of hydrolysis resistance, a sodium salt is preferred, and sodium dihydrogen phosphate is particularly preferred. A plurality of alkali metal phosphates may be used in combination.

The form at the time of addition may be any of powder, slurry, and solution. From the viewpoint of dispersibility, the alkali metal phosphate is preferably added as a solution. In this example, the solvent is preferably the same as the diol component of the polyester resin composition. In polyethylene terephthalate, ethylene glycol is particularly preferably used.

Furthermore, a solution of phosphoric acid and alkali metal phosphate is preferably mixed and added. When phosphoric acid and alkali metal phosphate are mixed and added as a buffer solution, better hydrolysis resistance can be achieved, and the amount of linear oligomers generated during the processing step of the polyester resin composition can be reduced.

Moreover, an alkali metal compound other than the alkali metal phosphate may be used in combination within the above-described range that satisfies the amount of the alkali metal element to be added. Specific examples include hydroxides, acetates, carbonates, nitrates and chlorides and the like of lithium, sodium and potassium. Among these, the use of potassium hydroxide in combination can reduce the specific resistance in a molten polyester resin, which is required for film formation by electrostatic application, without increasing the amount of generated linear oligomers and, thus, the moldability is improved.

When the method includes an esterification reaction, an additional glycol component such as ethylene glycol is preferably added after the esterification reaction and before the alkali metal phosphate is added. More preferably, the addition is conducted after the manganese compound is added and before the alkali metal phosphate is added. Since the low molecular weight oligomers of the polyester resin composition obtained by the esterification reaction have a higher degree of polymerization than the low molecular weight oligomers obtained by the transesterification reaction, the alkali metal phosphate is difficult to be dispersed, thereby likely resulting in heterogenization. Therefore, the decrease in the polymerization degree by the addition of a glycol component such as ethylene glycol and the depolymerization can suppress heterogenization. In this example, if a manganese compound is present, the depolymerization can be performed more efficiently.

The additional glycol component such as ethylene glycol is preferably 0.05 times or more and 0.5 times or less in mol with respect to the total acid component. The additional glycol component is more preferably 0.1 times or more and 0.3 times or less in mol. Within the above range, the polymerization time delay by the temperature fall in a polymerization system is prevented, and the heterogenization of the alkali metal phosphate can be suppressed.

For the other catalysts used in the production of the polyester resin composition, a known transesterification catalyst, a polycondensation catalyst, or a co-catalyst can be used. Examples of the polymerization catalyst include, but are not limited to, antimony compounds, germanium compounds, titanium compounds, and aluminum compounds. Examples of transesterification catalysts and co-catalysts include, but are not limited to, manganese compounds, magnesium compounds, calcium compounds, cobalt compounds, zinc compounds, lithium compounds, sodium compounds, and potassium compounds.

As long as the desired effect is not impaired, the polyester resin composition may be, as required, blended with a terminal blocking agent, an antioxidant, an ultraviolet absorber, a flame retardant, a fluorescent whitening agent, a flatting agent, a plasticizer or a defoaming agent or other additive(s). The blending method may be adding during the polymerization process of polyester or melt-kneading separately into the polyester resin composition after the polymerization.

Hereinafter, the specific examples of the method of producing a polyester resin composition are given, but the method is not limited to them.

To an esterification reactor charged with bishydroxyethyl terephthalate melted at 255° C., a slurry of terephthalic acid and ethylene glycol (1.15 times the amount of terephthalic acid (mol)) is added gradually via a progressive cavity pump to develop the esterification reaction. The temperature inside the reaction system is controlled at 245 to 255° C., and the esterification reaction is considered to be over when the reaction ratio reaches 95%.

The resulting esterification reaction product of 255° C. is transferred to a polymerization apparatus and then a manganese compound and a polycondensation catalyst are added. Ethylene glycol is further added, and a phosphorus compound and alkali metal phosphate are added. In this operation, the temperature inside the reaction system is preferably kept at 240 to 255° C. so that the esterification product will not solidify.

After that, while the temperature of the polymerization apparatus is gradually raised to 290° C., the pressure inside the polymerization apparatus is gradually reduced from a normal pressure to 133 Pa or less, and ethylene glycol is distilled. The reaction is finished when a predetermined stirring torque is reached, and the reaction system is set at a normal pressure with nitrogen gas. The molten polymer is discharged into cold water in a strand shape and cut. Thus, a polyester resin composition is obtained.

The polyester resin composition is excellent in heat resistance and hydrolysis resistance and results in a small amount of a gel composition and linear oligomers that are generated during a melt-molding step and a processing step. Therefore, the polyester resin composition can be suitably used for various applications such as films, fibers, and molded articles. In particular, the polyester film can be used for high-quality films such as optical films and releasable films that require high transparency.

The film may be a single film made of the polyester resin composition or a laminated film having at least one layer of the polyester resin composition. In particular, in a laminated film, the laminated film preferably has a layer composed of the polyester resin composition on at least one surface. When the layer composed of the polyester resin composition is present on a film surface, the volatilization or the like of linear oligomers from the film surface is suppressed. Thus, the linear oligomer defects can be effectively suppressed.

EXAMPLES

Our compositions and methods will be described below in detail by way of Examples. The physical property values in Examples were measured by the following methods. The method described below describes a measurement method for a single component such as a pellet of the polyester resin composition, but in a molded article composed of a plurality of resins such as a laminated film, the resin of each layer is cut out and isolated for the analysis.

(1) The Intrinsic Viscosity (IV) of the Polyester Resin Composition

With an accuracy of 0.001 g, 0.1 g of the polyester resin composition was weighed and dissolved in 10 ml of o-chlorophenol by heating at 100° C. for 30 minutes. The solution was cooled to room temperature, and 8 ml of the solution was charged into an Ostwald viscometer installed in a water bath of 25° C. The number of seconds required for passing the marked line was measured (A seconds).

Using 8 ml of o-chlorophenol alone, the number of seconds required for passing the marked line was also measured with an Ostwald viscometer installed in a water bath of 25° C. in the same manner as described above (B seconds).

The intrinsic viscosity was calculated according to the following equation.

$$IV = -1 + [1 + 4 \times K \times \{(A/B) - 1\}]^{0.5}/(2 \times K \times C)$$

wherein K is 0.343, and C is the concentration of the sample solution (g/100 ml).

(2) The Amount of COOH End Groups of the Polyester Resin Composition

The measurement was carried out according to the method of Maurice. (Literature M. J. Maurice, F. Huizinga, Anal. Chem. Acta, 22, 363 (1960)).

That is, with an accuracy of 0.001 g, 0.5 g of the polyester resin composition is weighed. Then, 50 ml of a solvent in which o-cresol/chloroform are mixed at a mass ratio of 7/3 is added to the sample, and the sample is heated until the internal temperature reaches 90° C. and dissolved under heating and stirring for 20 minutes. Similarly, the mixed solvent alone is separately heated as a blank solution. The solution is cooled to room temperature and titrated with a 1/50 N potassium hydroxide solution in methanol using a potentiometric titrator. The blank solution containing only the mixed solvent is also titrated in the same manner.

The amount of COOH end groups of the polyester resin composition was calculated by the following equation.

$$\text{The amount of COOH end groups (equivalent/ton)} = \{(V1 - V0) \times N \times f\} \times 1000/S,$$

wherein V1 is the amount of titrant in the sample solution (mL), V0 is the amount of titrant in the blank solution (mL), N is the normality (N) of the titrant, f is the factor of the titrant, and S is the mass (g) of the polyester resin composition.

(3) The Content of Manganese and Phosphorus, and Alkali Metal Element in the Polyester Resin Composition The quantification was performed by the atomic absorption method ((Hitachi, Ltd.: polarized zeeman atomic absorption spectrophotometer 180-80, Flame: acetylene, air).

(4) The Content of Nitrogen Element in the Polyester Resin Composition

The polyester resin composition was frozen and crushed, and then dried under reduced pressure at a room temperature for 3 hours. Thereafter, the quantification was performed by ICP emission spectroscopic analysis (ND-100 type, manufactured by Mitsubishi Chemical Corporation).

(5) The Content of Sulfur and Halogen Elements in the Polyester Resin Composition The polyester resin composition was frozen and crushed, and then dried under reduced pressure at a room temperature for 3 hours. The quantification was performed by the combustion ion chromatography (ICA2000 manufactured by DKK-TOA CORPORATION). The value of less than 5 ppm was considered as below the lower limit of detection (ND).

(6) The Gelation Ratio of the Polyester Resin Composition

The polyester resin composition was crushed using a freezer mill (manufactured by Sprex CertiPrep), and 0.5 g of the polyester resin composition was weighed out in a 50-ml stainless beaker. The polyester resin composition was then vacuum-dried at 50° C. for 2 hours, using a vacuum drying machine, and subjected to a heat treatment at 300° C. for 6 hours under a stream of nitrogen gas with an oxygen concentration of 1% (flow rate 0.5 L/min). The resultant was then dissolved in 20 ml of o-chlorophenol at 160° C. for 1 hour and allowed to cool. This solution was filtered through a glass filter (manufactured by SIBATA SCIENTIFIC TECHNOLOGY LTD., 3GP40). The glass filter was washed with dichloromethane. The glass filter was dried at 130° C. for 2 hours. From the increment in the weight of the filter between before and after the filtration, the weight ratio to the polyester weight (0.5 g) was obtained, and used as the gelation ratio (%).

(7) The Evaluation of Hydrolysis Resistance of the Polyester Resin Composition (ΔCOOH/COOH)

The polyester resin composition was subjected to a moist-heat treatment under saturated steam at 155° C. for 4 hours, and the amount of COOH end groups before and after the treatment was measured to calculate the increased amount of the COOH end groups (ΔCOOH=COOH after treatment —COOH before treatment). This value of ΔCOOH was divided by the amount of COOH end groups before the treatment to evaluate the hydrolysis resistance. The following heat treatment apparatus was used as the treatment apparatus.

PRESSER COOKER 306 S III (manufactured by HIRAYAMA MANUFACTURING CORPORATION).

(8) The Amount of Generated Linear Oligomers in the Polyester Resin Composition

The polyester resin composition was left for 24 hours or more in an environment of a temperature of 23° C. and a humidity of 50%, and then 0.1 g of the polyester resin composition (water content of 2500 ppm) was weighed and charged into a sealed tube having a nitrogen atmosphere inside. The melting treatment was performed at 290° C. for 20 minutes. The sample in the sealed tube after the melting treatment was dissolved in 2 mL of a mixture solution of HFIP (hexafluoro-2-propanol)/chloroform=1/1 (volume) and transferred to a beaker. After 3 mL of chloroform was added, 40 mL of methanol was gradually added. The mixture was then filtered through a paper filter (ADVANTEC No. 2), and the resulting solution concentrated and evaporated to dryness. To the resulting residue was added 0.5 mL of DMF (N,N-dimethylformamide) and, thus, the residue was dissolved and dispersed. Ethanol was then added to adjust the volume to 5 mL. The solution was then filtered through a PTFE membrane filter with a pore size of 0.45 and the filtrate used as a sample solution. The resulting sample solution was analyzed by LC/UV to measure the content of linear oligomers (TPA, MHET, BHET) in the polyester resin composition after the melting treatment. The difference in the content of linear oligomers before and after the melting treatment (content after melting treatment−content before melting treatment) was calculated to determine the amount of generated linear oligomers.

Example 1

To an esterification reactor charged with 105 parts by weight of bishydroxyethyl terephthalate dissolved at 255° C., a slurry composed of 86 parts by weight of terephthalic acid and 37 parts by weight of ethylene glycol (1.15 times the amount of terephthalic acid (mol)) was added gradually to advance the esterification reaction. The temperature inside the reaction system was controlled at 245 to 255° C., and the esterification reaction considered to be over when the reaction ratio reached 95%.

After 105 parts by weight of the resulting esterification reaction product of 255° C. (equivalent to 100 parts by weight of PET) was transferred to a polymerization apparatus, a solution of 0.01 parts by weight of manganese acetate tetrahydrate (23 ppm as a manganese element) in ethylene glycol and a slurry of 0.012 parts by weight of diantimony trioxide in ethylene glycol were added. Thereafter, 5 parts by weight of ethylene glycol (0.15 times in mol with respect to the terephthalic component) was added to proceed the depolymerization, and then a mixed solution of 0.006 parts by weight of phosphoric acid and 0.0095 parts by weight of sodium dihydrogen phosphate dihydrate (14 ppm as a sodium element) in ethylene glycol was added.

While the temperature of the polymerization apparatus was gradually raised to 290° C., the pressure inside the polymerization apparatus was gradually reduced from a normal pressure to 133 Pa or less, and ethylene glycol distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 1.

The resulting polyester resin composition obtained in Example 1 exhibited a good gelation ratio and good hydrolysis resistance and also showed a small amount of generated linear oligomers. Thus, the polyester resin composition had suitable physical properties for optical films and releasable films.

Examples 2 to 5, Comparative Examples 1 to 3

Polyester resin compositions were obtained in the same way as in Example 1 except that the amount of manganese compound and phosphoric acid to be added was changed as in Table 1. Properties of the resulting polyester resin compositions are shown in Table 1.

The resulting polyester resin compositions obtained in Examples 2 to 5 exhibited a good gelation ratio and good hydrolysis resistance and also showed a small amount of generated linear oligomers. Thus, the polyester resin compositions had suitable physical properties for optical films and releasable films.

Since the polyester resin composition obtained in Comparative Example 1 did not contain a manganese compound, the gelation ratio and ΔCOOH/COOH increased.

To the polyester resin compositions obtained in Comparative Examples 2 and 3, a large amount of the manganese compound was added. Therefore, ΔCOOH/COOH and the amount of generated linear oligomers increased.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Catalyst | Manganese compound type | Manganese acetate•tetrahydrate | Manganese acetate•tetrahydrate | Manganese acetate•tetrahydrate | Manganese acetate•tetrahydrate | Manganese acetate•tetrahydrate | — | Manganese acetate•tetrahydrate | Manganese acetate•tetrahydrate |
|  | Amount of manganese element to be added (ppm) | 23 | 5 | 10 | 30 | 40 | — | 45 | 150 |
|  | Amount of phosphoric acid to be added (ppm) | 60 | 60 | 60 | 60 | 60 | 60 | 60 | 170 |

TABLE 1-continued

|  |  | Example 1 | Example 2 | Example 3 | Example 4 | Example 5 | Comparative Example 1 | Comparative Example 2 | Comparative Example 3 |
|---|---|---|---|---|---|---|---|---|---|
|  | Amount of alkali metal phosphate to be added (ppm) | 95 | 95 | 95 | 95 | 95 | 95 | 95 | 260 |
|  | Amount of alkali metal element to be added (ppm) | 14 | 14 | 14 | 14 | 14 | 14 | 14 | 38 |
| Polymer properties | Content of manganese element (ppm) | 23 | 5 | 10 | 30 | 40 | — | 45 | 150 |
|  | Content of phosphorus element (ppm) | 30 | 30 | 30 | 30 | 30 | 30 | 30 | 85 |
|  | Alkali metal type | Na | Na | Na | Na | Na | Na | Na | Na |
|  | Content of alkali metal element (ppm) | 14 | 14 | 14 | 14 | 14 | 14 | 14 | 38 |
|  | Na content/P content (molar ratio) | 0.62 | 0.62 | 0.62 | 0.62 | 0.62 | 0.62 | 0.62 | 0.60 |
|  | Content of nitrogen element (ppm) | 0.6 | 0.5 | 0.5 | 0.6 | 0.5 | 0.5 | 0.5 | 0.6 |
|  | Content of sulfur element (ppm) | 0.5 | 0.4 | 0.5 | 0.6 | 0.5 | 0.5 | 0.5 | 0.6 |
|  | Content of halogen element (ppm) | ND | ND | ND | ND | ND | ND | ND | ND |
|  | IV | 0.62 | 0.61 | 0.62 | 0.62 | 0.62 | 0.61 | 0.61 | 0.61 |
|  | COOH (eq/ton) | 25 | 25 | 26 | 25 | 24 | 27 | 25 | 25 |
|  | Gelation ratio (wt %) | 3.5 | 6.5 | 3.8 | 3.2 | 3.3 | 10.2 | 3.5 | 4.5 |
|  | ΔCOOH/COOH | 1.8 | 2.0 | 1.9 | 1.9 | 2.0 | 2.2 | 2.1 | 2.2 |
|  | Amount of generated linear oligomers (ppm) | 520 | 650 | 580 | 600 | 890 | 700 | 1050 | 2380 |

ND: Less than the detection lower limit

Examples 6 to 9, Comparative Examples 4 and 5

Polyester resin compositions were obtained in the same way as in Example 1 except that the amount of the alkali metal phosphate to be added was changed as in Table 2. Properties of the resulting polyester resin compositions are shown in Table 2.

The resulting polyester resin compositions obtained in Examples 6 to 9 exhibited a good gelation ratio and good hydrolysis resistance and also showed a small amount of generated linear oligomers. Thus, the polyester resin compositions had suitable physical properties for optical films and releasable films.

To the polyester resin composition obtained in Comparative Example 4, the alkali metal phosphate was not added. Therefore, ΔCOOH/COOH and the amount of generated linear oligomers increased.

To the polyester resin composition obtained in Comparative Example 5, a large amount of the alkali metal phosphate was added. Therefore, the ΔCOOH/COOH increased.

TABLE 2

|  |  | Example 6 | Example 7 | Example 8 | Example 9 | Comparative Example 4 | Comparative Example 5 |
|---|---|---|---|---|---|---|---|
| Catalyst | Manganese compound type | Manganese acetate•tetra-hydrate | Manganese acetate•tetra-hydrate | Manganese acetate•tetra-hydrate | Manganese acetate•tetra-hydrate | Manganese acetate•tetra-hydrate | Manganese acetate•tetra-hydrate |
|  | Amount of manganese element to be added (ppm) | 23 | 23 | 23 | 23 | 23 | 23 |
|  | Amount of phosphoric acid to be added (ppm) | 60 | 60 | 60 | 60 | 60 | 60 |
|  | Amount of alkali metal phosphate to be added (ppm) | 30 | 70 | 150 | 270 | — | 350 |

TABLE 2-continued

|  |  | Example 6 | Example 7 | Example 8 | Example 9 | Comparative Example 4 | Comparative Example 5 |
|---|---|---|---|---|---|---|---|
| Polymer properties | Amount of alkali metal element to be added (ppm) | 4 | 10 | 22 | 40 | — | 51 |
|  | Content of manganese element (ppm) | 23 | 23 | 23 | 23 | 23 | 23 |
|  | Content of phosphorus element (ppm) | 20 | 26 | 39 | 58 | 15 | 71 |
|  | Alkali metal type | Na | Na | Na | Na | — | Na |
|  | Content of alkali metal element (ppm) | 4 | 10 | 22 | 40 | — | 51 |
|  | Na content/P content (molar ratio) | 0.30 | 0.53 | 0.76 | 0.92 | — | 0.98 |
|  | Content of nitrogen element (ppm) | 0.5 | 0.5 | 0.6 | 0.5 | 0.5 | 0.5 |
|  | Content of sulfur element (ppm) | 0.4 | 0.5 | 0.6 | 0.5 | 0.5 | 0.5 |
|  | Content of halogen element (ppm) | ND | ND | ND | ND | ND | ND |
|  | IV | 0.61 | 0.61 | 0.62 | 0.63 | 0.62 | 0.62 |
|  | COOH (eq/ton) | 25 | 25 | 26 | 25 | 24 | 29 |
|  | Gelation ratio (wt %) | 3.8 | 3.5 | 3.4 | 3.3 | 4.2 | 3.2 |
|  | ΔCOOH/COOH | 2.0 | 1.9 | 1.9 | 2.0 | 2.5 | 2.3 |
|  | Amount of generated linear oligomers (ppm) | 850 | 660 | 550 | 580 | 920 | 600 |

ND: Less than the detection lower limit

Examples 10 to 12, Comparative Example 6

Polyester resin compositions were obtained in the same way as in Example 1 except that the amount of the phosphoric acid to be added was changed as in Table 3. Properties of the resulting polyester resin compositions are shown in Table 3.

The resulting polyester resin compositions obtained in Examples 10 to 12 exhibited a good gelation ratio and good hydrolysis resistance and also showed a small amount of generated linear oligomers. Thus, the polyester resin compositions had suitable physical properties for optical films and releasable films.

To the polyester resin composition obtained in Comparative Example 6, the phosphoric acid was not added. Therefore, ΔCOOH/COOH and the amount of generated linear oligomers increased.

TABLE 3

|  |  | Example 10 | Example 11 | Example 12 | Comparative Example 6 |
|---|---|---|---|---|---|
| Catalyst | Manganese compound type | Manganese acetate tetrahydrate | Manganese acetate tetrahydrate | Manganese acetate tetrahydrate | Manganese acetate tetrahydrate |
|  | Amount of manganese element to be added (ppm) | 23 | 23 | 23 | 23 |
|  | Amount of phosphoric acid to be added (ppm) | 26 | 130 | 170 | — |
|  | Amount of alkali metal phosphate to be added (ppm) | 95 | 95 | 95 | 95 |
|  | Amount of alkali metal element to be added (ppm) | 14 | 14 | 14 | 14 |
| Polymer properties | Content of manganese element (ppm) | 23 | 23 | 23 | 23 |
|  | Content of phosphorus element (ppm) | 22 | 47 | 58 | 15 |
|  | Alkali metal type | Na | Na | Na | Na |
|  | Content of alkali metal element (ppm) | 14 | 14 | 14 | 14 |

TABLE 3-continued

|  | Example 10 | Example 11 | Example 12 | Comparative Example 6 |
|---|---|---|---|---|
| Na content/P content (molar ratio) | 0.86 | 0.40 | 0.32 | 1.24 |
| Content of nitrogen element (ppm) | 0.6 | 0.5 | 0.6 | 0.5 |
| Content of sulfur element (ppm) | 0.5 | 0.5 | 0.5 | 0.5 |
| Content of halogen element (ppm) | ND | ND | ND | ND |
| IV | 0.62 | 0.62 | 0.63 | 0.61 |
| COOH (eq/ton) | 24 | 25 | 28 | 21 |
| Gelation ratio (wt %) | 3.6 | 3.5 | 3.4 | 4.5 |
| ΔCOOH/COOH | 1.9 | 1.9 | 2.0 | 2.1 |
| Amount of generated linear oligomers (ppm) | 580 | 630 | 790 | 910 |

ND: Less than the detection lower limit

Example 13

To an esterification reactor charged with 105 parts by weight of bishydroxyethyl terephthalate dissolved at 255° C., a slurry composed of 86 parts by weight of terephthalic acid and 37 parts by weight of ethylene glycol (1.15 times the amount of terephthalic acid (mol)) was added gradually to advance the esterification reaction. The temperature inside the reaction system was controlled at 245 to 255° C., and the esterification reaction considered to be over when the reaction ratio reached 95%.

After 105 parts by weight of the resulting esterification reaction product of 255° C. (equivalent to 100 parts by weight of PET) was transferred to a polymerization apparatus, a solution of 0.01 parts by weight of manganese acetate tetrahydrate (23 ppm as a manganese element) in ethylene glycol, a slurry of 0.012 parts by weight of diantimony trioxide in ethylene glycol, and a solution of 0.0008 parts by weight of potassium hydroxide in ethylene glycol were added. Thereafter, 5 parts by weight of ethylene glycol (0.15 times in mol with respect to the terephthalic component) was added to proceed the depolymerization, and then a mixed solution of 0.006 parts by weight of phosphoric acid and 0.0095 parts by weight of sodium dihydrogen phosphate dihydrate (14 ppm as a sodium element) in ethylene glycol was added.

While the temperature of the polymerization apparatus was gradually raised to 290° C., the pressure inside the polymerization apparatus was gradually reduced from a normal pressure to 133 Pa or less, and ethylene glycol distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 4.

The resulting polyester resin composition obtained in Example 13 exhibited a good gelation ratio and good hydrolysis resistance and also showed a small amount of generated linear oligomers. Thus, the polyester resin composition had suitable physical properties for optical films and releasable films.

Example 14

Each of 101.0 parts by weight of dimethyl terephthalate and 64.6 parts by weight of ethylene glycol (2 times the dicarboxylic acid component (mol)) was weighed and charged into a transesterification reactor. After the content was dissolved at 150° C., a solution of 0.018 parts by weight of manganese acetate tetrahydrate (40 ppm as a manganese element) in ethylene glycol and a slurry of 0.012 parts by weight of diantimony trioxide in ethylene glycol were added and stirred. Methanol was distilled while heating to 240° C. After a predetermined amount of methanol was distilled, a mixed solution of 0.006 parts by weight of phosphoric acid and 0.0095 parts by weight of sodium dihydrogen phosphate dihydrate (14 ppm as sodium element) in ethylene glycol was added to complete the transesterification reaction.

Then, the reaction product was transferred to the polymerization apparatus. The internal temperature of the polymerization apparatus was gradually increased to 290° C. while the internal pressure of the polymerization apparatus was gradually reduced from normal pressure to 133 Pa or less. Thus, ethylene glycol was distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 4.

The resulting polyester resin composition obtained in Example 14 exhibited a good gelation ratio and good hydrolysis resistance and also showed a small amount of generated linear oligomers. Thus, the polyester resin composition had suitable physical properties for optical films and releasable films.

Example 15

The esterification reaction was carried out in the same manner as in Example 1. After 105 parts by weight of the resulting esterification reaction product of 255° C. (equivalent to 100 parts by weight of PET) was transferred to a polymerization apparatus, a solution of 0.01 parts by weight of manganese acetate tetrahydrate (23 ppm as a manganese element) in ethylene glycol and a slurry of 0.012 parts by weight of diantimony trioxide in ethylene glycol were added. Thereafter, 5 parts by weight of ethylene glycol (0.15 times in mol with respect to the terephthalic component) was added to proceed the depolymerization, and then a mixed solution of 0.006 parts by weight of phosphoric acid and 0.0095 parts by weight of sodium dihydrogen phosphate dihydrate (14 ppm as a sodium element) in ethylene glycol was added. Then, 0.01 parts by weight of tetrabutylammonium methanesulfonate was added.

While the temperature of the polymerization apparatus was gradually raised to 290° C., the pressure inside the polymerization apparatus was gradually reduced from a normal pressure to 133 Pa or less, and ethylene glycol distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 4.

In Example 15, about 9 ppm in total of the nitrogen element and the sulfur element was contained, and the gelation ratio and the amount of generated linear oligomers increased compared to Example 1.

Example 16

To an esterification reactor charged with 105 parts by weight of bishydroxyethyl terephthalate dissolved at 255° C., a slurry composed of 86 parts by weight of terephthalic acid and 37 parts by weight of ethylene glycol (1.15 times the amount of terephthalic acid (mol)) was added gradually to advance the esterification reaction. The temperature inside the reaction system was controlled at 245 to 255° C., and the esterification reaction considered to be over when the reaction ratio reached 95%.

After 105 parts by weight of the resulting esterification reaction product of 255° C. (equivalent to 100 parts by weight of PET) was transferred to a polymerization apparatus, a solution of 0.01 parts by weight of manganese acetate tetrahydrate (23 ppm as a manganese element) in ethylene glycol and a slurry of 0.012 parts by weight of diantimony trioxide in ethylene glycol were added. Then 5 parts by weight of ethylene glycol (0.15 times in mol with respect to the terephthalic component) was added to proceed the depolymerization, and then a solution of 0.0086 parts by weight of trimethyl phosphoric acid and 0.0095 parts by weight of sodium dihydrogen phosphate dihydrate (14 ppm as a sodium element) in mixed ethylene glycol was added.

While the temperature of the polymerization apparatus was gradually raised to 290° C., the pressure inside the polymerization apparatus was gradually reduced from a normal pressure to 133 Pa or less, and ethylene glycol distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 4.

Example 17

A polyester resin composition was obtained by polymerization in the same manner as in Example 16 except that the phosphorus compound was changed from trimethyl phosphoric acid to ethyl diethyl phosphonoacetate and its amount to be added was 0.0137 parts by weight. Properties of the resulting polyester resin composition are shown in Table 4.

Comparative Example 7

To an esterification reactor charged with 105 parts by weight of bishydroxyethyl terephthalate dissolved at 255° C., a slurry composed of 86 parts by weight of terephthalic acid and 37 parts by weight of ethylene glycol (1.15 times the amount of terephthalic acid (mol)) was added gradually to advance the esterification reaction. The temperature inside the reaction system was controlled at 245 to 255° C., and the esterification reaction considered to be over when the reaction ratio reached 95%.

After 105 parts by weight of the resulting esterification reaction product of 255° C. (equivalent to 100 parts by weight of PET) was transferred to a polymerization apparatus, a solution of 0.02 parts by weight of manganese acetate tetrahydrate (45 ppm as a manganese element) in ethylene glycol and a slurry of 0.012 parts by weight of diantimony trioxide in ethylene glycol were added. Thereafter, 5 parts by weight of ethylene glycol (0.15 times in mol with respect to the terephthalic component) was added to proceed the depolymerization, and then a mixed solution of 0.006 parts by weight of phosphoric acid and 0.011 parts by weight of sodium dihydrogen phosphate dihydrate (16 ppm as a sodium element) in ethylene glycol was added. Then, 0.1 parts by weight of tetrabutyl ammonium bromide was added.

While the temperature of the polymerization apparatus was gradually raised to 290° C., the pressure inside the polymerization apparatus was gradually reduced from a normal pressure to 133 Pa or less, and ethylene glycol distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 4.

The polyester resin composition obtained in Comparative Example 7 contained a large amount of manganese element and nitrogen element, and halogen element. Therefore, the gelation ratio and ΔCOOH/COOH increased, resulting in the increased amount of generated linear oligomers.

Comparative Example 8

To an esterification reactor charged with 105 parts by weight of bishydroxyethyl terephthalate dissolved at 255° C., a slurry composed of 86 parts by weight of terephthalic acid and 37 parts by weight of ethylene glycol (1.15 times the amount of terephthalic acid (mol)) was added gradually to advance the esterification reaction. The temperature inside the reaction system was controlled at 245 to 255° C., and the esterification reaction considered to be over when the reaction ratio reached 95%.

After 105 parts by weight of the resulting esterification reaction product of 255° C. (equivalent to 100 parts by weight of PET) was transferred to a polymerization apparatus, a solution of 0.02 parts by weight of manganese acetate tetrahydrate (45 ppm as a manganese element) in ethylene glycol and a slurry of 0.012 parts by weight of diantimony trioxide in ethylene glycol were added. Thereafter, 5 parts by weight of ethylene glycol (0.15 times in mol with respect to the terephthalic component) was added to proceed the depolymerization, and then a mixed solution of 0.006 parts by weight of phosphoric acid and 0.011 parts by weight of sodium dihydrogen phosphate dihydrate (16 ppm as a sodium element) in ethylene glycol was added. Then, 0.1 parts by weight of tetrabutylammonium methanesulfonate was added.

While the temperature of the polymerization apparatus was gradually raised to 290° C., the pressure inside the polymerization apparatus was gradually reduced from a normal pressure to 133 Pa or less, and ethylene glycol distilled. The reaction was finished when the melt viscosity corresponding to the intrinsic viscosity of 0.62 was reached, and the reaction system set at a normal pressure with nitrogen gas. The molten polymer was discharged from the bottom of the polymerization apparatus into cold water in a strand shape and cut. Thus, a polyester resin composition was obtained. Properties of the resulting polyester resin composition are shown in Table 4.

The polyester resin compositions obtained in Comparative Example 8 contained a large amount of manganese element and nitrogen element, and sulfur element. Therefore, the gelation ratio and ΔCOOH/COOH increased, resulting in the increased amount of generated linear oligomers.

TABLE 4

| | | Example 13 | Example 14 | Example 15 | Example 16 | Example 17 | Comparative Example 7 | Comparative Example 8 |
|---|---|---|---|---|---|---|---|---|
| Catalyst | Manganese compound type | Manganese acetate•tetra-hydrate | Manganese acetate•tetra-hydrate | Manganese acetate•tetra-hydrate | Manganese acetate•tetra-hydrate | Manganese acetate•tetra-hydrate | Manganese acetate•tetra-hydrate | Manganese acetate•tetra-hydrate |
| | Phosphorus compound type | Phosphoric acid | Phosphoric acid | Phosphoric acid | trimethyl phosphoric acid | ethyl diethyl-phosphonoacetate | Phosphoric acid | Phosphoric acid |
| | Amount of manganese element to be added (ppm) | 23 | 40 | 23 | 23 | 23 | 45 | 45 |
| | Amount of phosphorus compound to be added (ppm) | 60 | 60 | 60 | 86 | 137 | 60 | 60 |
| | Amount of alkali metal phosphate to be added (ppm) | 95 | 95 | 95 | 95 | 95 | 110 | 110 |
| | Amount of alkali metal element to be added (ppm) | 19 | 14 | 14 | 14 | 14 | 16 | 16 |
| Polymer properties | Content of manganese element (ppm) | 23 | 40 | 23 | 23 | 23 | 45 | 45 |
| | Content of phosphorus element (ppm) | 30 | 30 | 30 | 30 | 30 | 33 | 33 |
| | Alkali metal type | Na/K | Na | Na | Na | Na | Na | Na |
| | Content of alkali metal element (ppm) | 14/5 | 14 | 14 | 14 | 14 | 16 | 16 |
| | Na content/P content (molar ratio) | 0.62 | 0.62 | 0.62 | 0.62 | 0.62 | 0.66 | 0.66 |
| | Content of nitrogen element (ppm) | 0.5 | 0.5 | 2.5 | 0.5 | 0.5 | 25 | 23 |
| | Content of sulfur element (ppm) | 0.4 | 0.5 | 6.2 | 0.5 | 0.4 | 0.6 | 56 |
| | Content of halogen element (ppm) | ND | ND | ND | ND | ND | 180 | ND |
| | IV | 0.61 | 0.62 | 0.62 | 0.62 | 0.62 | 0.62 | 0.62 |
| | COOH (eq/ton) | 25 | 22 | 30 | 27 | 26 | 31 | 29 |
| | Gelation ratio (wt %) | 3.5 | 3.5 | 7 | 5.2 | 4.5 | 6.8 | 7.2 |
| | ΔCOOH/COOH | 1.8 | 2.0 | 2.0 | 2.0 | 2.0 | 2.4 | 3.5 |
| | Amount of generated linear oligomers (ppm) | 580 | 870 | 890 | 650 | 600 | 1150 | 1350 |

ND: Less than the detection lower limit

The invention claimed is:

1. A polyester resin composition that satisfies formulas (I) to (IV):

an amount of generated linear oligomers (weight ratio with respect to said polyester resin composition)<900 ppm   (I)

ΔCOOH/COOH≤2.0   (II)

5 ppm≤Mn content (weight ratio with respect to said polyester resin composition)≤40 ppm   (III), and 4 ppm≤Na content (weight ratio with respect to said polyester resin composition)≤40 ppm   (IV)

wherein ΔCOOH is an increased amount of COOH end groups (equivalent/ton) after a moist-heat treatment under saturated steam at 155° C. for 4 hours, and COOH is an amount of carboxyl end groups (equivalent/ton) in said polyester resin composition before said moist-heat treatment, and the total content of elements selected from nitrogen, sulfur and a halogen (weight ratio with respect to said polyester resin composition) is less than 10 ppm.

2. The polyester resin composition according to claim 1, wherein a content of phosphorus element (weight ratio with respect to said polyester resin composition) is 17 ppm or more and 70 ppm or less.

3. The polyester resin composition according to claim 1, wherein Na/P, which is a molar ratio of a content of sodium element to a content of phosphorus element, is 0.3 or more and 1.2 or less.

4. The polyester resin composition according to claim 1, having a gelation ratio of 7 wt % or less.

5. The polyester resin composition according to claim 1, wherein said polyester is polyethylene terephthalate.

6. A polyester film composed of the polyester resin composition according to claim 1.

7. A laminated polyester film having at least one layer composed of the polyester resin composition according to claim 1.

8. A laminated polyester film having a layer composed of the polyester resin composition according to claim 1 on at least one surface.

9. A releasable polyester film composed of the polyester resin composition according to claim 1.

10. A method of producing a polyester resin composition, comprising subjecting a dicarboxylic acid component or an ester-forming derivative component thereof and a diol component to an esterification reaction or a transesterification reaction followed by a polycondensation reaction to produce a polyester, wherein a manganese compound is added while the IV (intrinsic viscosity) of said polyester is 0.4 or less, a phosphorus compound and alkali metal phosphate are added before the end of said polycondensation reaction, and contents thereof satisfy formulas (V) and (VI):

5 ppm≤Mn content (weight ratio with respect to said polyester resin composition)≤40 ppm   (V)

4 ppm≤alkali metal element content (weight ratio with respect to said polyester resin composition)≤40 ppm   (VI), and the total content of elements selected from nitrogen, sulfur and a halogen (weight ratio with respect to said polyester resin composition) is less than 10 ppm.

11. The method of producing a polyester resin composition according to claim 10, wherein said alkali metal phosphate is sodium phosphate.

12. The method of producing a polyester resin composition according to claim 10, wherein said phosphorus compound is phosphoric acid.

13. The method of producing a polyester resin composition according to claim 10, wherein said polyester is polyethylene terephthalate.

14. The method of producing a polyester resin composition according to claim 11, wherein said phosphorus compound is phosphoric acid.

* * * * *